Patented Feb. 12, 1935

1,990,628

UNITED STATES PATENT OFFICE 1,990,628

ELECTRIC ARC WELDING

Orrin E. Andrus, Milwaukee, Wis., assignor to A. O. Smith Corporation, Milwaukee, Wis., a corporation of New York No Drawing. Application March 31, 1930, Serial No. 440,610. Renewed June 19, 1933

16 Claims. (Cl. 219—8)

This invention relates to electric arc welding and has for its principal object the provision of a metal weldrod which will produce a gaseous atmosphere at the arc for giving desirable welding characteristics thereto and which does not have the disadvantages usually accompanying covered weldrods or other means of providing such an atmosphere.

Another object of the invention is to provide a novel means of supplying a gaseous medium, such as hydrogen, to the arc whereby the metal of the weldrod, which is progressively projected through the arc, is protected from oxidation and contamination and the arc is more readily maintained in a stable condition, allowing the employment of higher current values and greater energy.

Another object is to provide a welding electrode of improved characteristics in rate of welding, ease of manipulation and quality of deposit.

In carrying out the invention in its preferred embodiment, the metal weldrod is provided with hydrogen occluded therein. The occluded hydrogen is liberated at the arc as the metal of the weldrod becomes progressively vaporized in the welding operation and the hydrogen provides a protecting resistive atmosphere at the arc which not only prevents oxidation and contamination of the metal being deposited, but which increases the resistance of the arc to an extent requiring increased current values for good welding. For instance, whereas in commercial welding practices with ordinary metal weldrods heretofore employed the arc potential has generally not exceeded twenty-five volts and the welding currents ranged from about one hundred amperes for one-eighth inch weldrods to about three hundred amperes as a maximum for one-fourth inch weldrods, the present invention provides a metal weldrod which can be employed with high current values, including an arc potential of forty volts and welding currents ranging from one hundred fifty amperes for one-eighth inch weldrods to about four hundred amperes for one-fourth inch weldrods. The welding energy may be more than double that employed in ordinary practices with a consequent proportionate increase in the rate of welding, and with larger weldrods and more hydrogen occluded in the steel of the weldrod, greater energies than above indicated may be employed.

The weldrod comprises ordinary steel or other suitable welding metal and the hydrogen is occluded therein by any suitable treatment such as subjecting the weldrod to a prolonged pickling operation in an acid, preferably in the absence of an inhibiter, or such as providing an electrolytic treatment in which the weldrod is made an electrode at which nascent hydrogen is liberated from the electrolyte.

The penetration of the hydrogen into the steel of the weldrod depends upon the metal of the weldrod and the process and conditions of manufacture. It has been found that higher carbon steels occlude hydrogen more readily than do low carbon steels.

The hydrogen, when once absorbed by the steel, does not ordinarily escape and the weldrods may be kept for substantial periods of time without material deterioration. However, it is preferable to use them shortly after the manufacture thereof, or in case storage is necessary, an exterior coating such as a copper plating may be provided on the weldrod to prevent untimely escape of the hydrogen. The weldrod may be provided with any suitable covering material such as a carbohydrate material mixed with sodium silicate.

In the welding operation, the hydrogen is liberated at the arc by the vaporization of the metal in which it is occluded. The hydrogen atmosphere thus produced about the arc has all of the advantages of a reducing atmosphere of hydrogen which is supplied from an external source, and in addition, does not require a high striking voltage.

It is preferable to apply the welding current to the weldrod at a point sufficiently close to the arc to prevent undue heating of the weldrod by its resistance to the flow of the current, since heating of the metal of the rod tends to force the hydrogen therefrom and thereby prevent its liberation at the arc.

The invention may be practiced with weldrods of definite length or with a reel of welding wire which is fed to the arc by automatic or semi-automatic feeding means. Thus the weldrod is, when used without a covering, for the purposes of handling, the same as a bare wire and retains all of the advantages thereof, and has the added welding characteristics of a covered weldrod of special construction.

Where the invention is employed in bare wire welding with the electrode positive, the efficiency of deposit is increased particularly with higher arc lengths and higher amperages than is the case when ordinary bare wire electrodes are employed. This permits a welder to hold a longer arc without any loss in efficiency or rate of deposit. The ease of holding an arc with the hydrogen gas present, and the wide range of arc length permitted are material advantages in bare wire welding. The increased electrical energy employed effects a higher rate of deposit per welding time and thereby effects considerable saving and economy in welding operations.

Various modifications of the invention may be employed within the scope of the accompanying claims.

I claim:

1. The method of electric arc welding which comprises the step of maintaining a welding arc between the work to be welded and a metal weld-rod having a substantial amount of hydrogen occluded therein while supplying said arc with current of high value.

2. The method of electric arc welding which comprises arcing between the work and a steel rod which contains a substantial amount of hydrogen occluded therein, and maintaining a current of high value through the arc.

3. A metallic arc welding electrode comprising a ferrous metal rod and hydrogen occluded in the metal, the hydrogen being at least that which may be occluded by subjecting a like ferrous metal rod to pickling in an acid in the absence of an inhibitor.

4. A metallic arc welding electrode comprising a carbon steel rod and hydrogen occluded in the steel, the hydrogen being at least that which may be occluded in steel by subjecting a like steel rod to prolonged pickling in an acid in the absence of an inhibitor.

5. A metallic arc welding electrode comprising a ferrous metal rod having hydrogen occluded in the metal and a covering for preventing the untimely liberation of hydrogen, the hydrogen being at least that which may be occluded by subjecting a like ferrous metal rod to pickling in acid in the absence of an inhibitor.

6. A metallic arc welding electrode comprising a carbon steel rod and hydrogen occluded in the steel, the hydrogen being at least that which may be occluded in a like steel rod in the absence of an inhibitor by electrolysis of an electrolytic bath when the rod constitutes an electrode where nascent hydrogen is liberated.

7. A metallic arc welding electrode comprising a metal rod having occluded therein an amount of hydrogen that may be occluded by picking the rod in the absence of an inhibitor, and a covering on said rod tending to prevent untimely liberation of said hydrogen.

8. A metallic arc welding electrode comprising a metal rod having occluded therein an amount of hydrogen that may be occluded by pickling the rod in the absence of an inhibitor, and a coating of copper plating on said rod.

9. A metallic arc welding electrode comprising a ferrous metal rod and a gaseous constituent in the metal thereof of such kind and in sufficient amount to substantially increase the rate of deposit of weld metal therefrom.

10. A metallic arc welding electrode comprising a ferrous metal rod and hydrogen occluded therein in quantities sufficient to substantially increase the rate and efficiency of deposit of weld metal therefrom.

11. A metallic arc welding electrode comprising a ferrous metal rod having a substantial amount of hydrogen occluded therein, and a heavy covering of carbohydrate material and sodium silicate.

12. A metallic arc welding electrode for use with positive polarity comprising a bare ferrous metal rod having hydrogen occluded therein in an amount to obtain a more uniform efficiency of deposit irrespective of variations in amperage and voltage at the arc.

13. A metallic arc welding electrode comprising a ferrous metal rod containing in solution therein an amount of hydrogen that may be occluded by prolonged pickling of the rod, and a covering containing slag forming ingredients and adapted to prevent untimely liberation of the hydrogen.

14. The method of manufacturing electrodes for electric arc welding comprising subjecting a ferrous metal rod of suitable dimensions for the welding operation to a treatment in which nascent hydrogen is liberated at the surface of the rod, said treatment being for a sufficient length of time so that hydrogen is occluded in the rod in sufficient amounts to increase the efficiency and rate of deposit of arc welding metal from the rod.

15. A metallic arc welding electrode comprising a metal rod or wire having substantial amounts of hydrogen occluded therein to give improved welding characteristics thereto.

16. A metallic arc welding electrode comprising a metal rod or wire having a substantial amount of hydrogen occluded therein and a covering on said rod tending to prevent untimely liberation of said hydrogen.

ORRIN E. ANDRUS.